(12) United States Patent
Edelmann et al.

(10) Patent No.: US 7,173,430 B2
(45) Date of Patent: Feb. 6, 2007

(54) COLD-CATHODE IONIZATION MANOMETER HAVING A LONGER SERVICE LIFE DUE TO TWO SEPARATE CATHODES

(75) Inventors: Christian Edelmann, Freiberg (DE); Stefan Wilfert, Magdeburg (DE)

(73) Assignee: Otto-von-Guericke Universitaet Magdeburg, Magdeburg (DE)

( * ) Notice: Subject to any disclaimer, the term of this patent is extended or adjusted under 35 U.S.C. 154(b) by 0 days.

(21) Appl. No.: 10/528,600

(22) PCT Filed: Sep. 17, 2003

(86) PCT No.: PCT/DE03/03107

§ 371 (c)(1),
(2), (4) Date: Mar. 21, 2005

(87) PCT Pub. No.: WO2004/029572

PCT Pub. Date: Apr. 8, 2004

(65) Prior Publication Data
US 2006/0012373 A1    Jan. 19, 2006

(30) Foreign Application Priority Data
Sep. 19, 2002  (DE) ................. 102 43 634

(51) Int. Cl.
*G01L 21/30*  (2006.01)
*G01L 21/34*  (2006.01)
(52) U.S. Cl. ....................... 324/460; 324/463
(58) Field of Classification Search ................ 324/460, 324/463
See application file for complete search history.

(56) References Cited

U.S. PATENT DOCUMENTS

| | | | | |
|---|---|---|---|---|
| 3,382,389 | A | 5/1968 | Schaedler | 313/7 |
| 3,872,377 | A * | 3/1975 | Kageyama et al. | 324/463 |
| 4,000,457 | A | 12/1976 | O'Neal | 324/33 |
| 4,047,102 | A | 9/1977 | Welch | 324/33 |
| 4,423,355 | A * | 12/1983 | Kageyama | 315/111.81 |
| 5,568,053 | A | 10/1996 | Drubetsky et al. | 324/463 |
| 6,351,131 | B1 * | 2/2002 | Klepper et al. | 324/463 |

FOREIGN PATENT DOCUMENTS

| | | |
|---|---|---|
| CH | 431 131 | 8/1967 |
| CH | 431131 | 8/1967 |
| DE | 1648689 | 5/1971 |
| DE | 197 17 263 | 10/1998 |
| DE | 197 17 263 A1 | 10/1998 |
| GB | 555134 | 8/1943 |
| GB | 1535314 | 12/1978 |

* cited by examiner

*Primary Examiner*—Andrew H. Hirshfeld
*Assistant Examiner*—Timothy J. Dole
(74) *Attorney, Agent, or Firm*—Karl Hormann

(57) ABSTRACT

A cold cathode ionization manometer operating according to the inverse magnetron principle to measure pressures in fine vacuums, high vacuums, and ultrahigh vacuums (preferably between $10^{-2}$ Pa and 1 Pa). To reduce the contamination and thus to extend the service life the measuring tube is provided with two separately controlled and axially displaced cathodes and a coaxially arranged common anode within a vacuum-proof housing.

15 Claims, 1 Drawing Sheet

Figure 1:
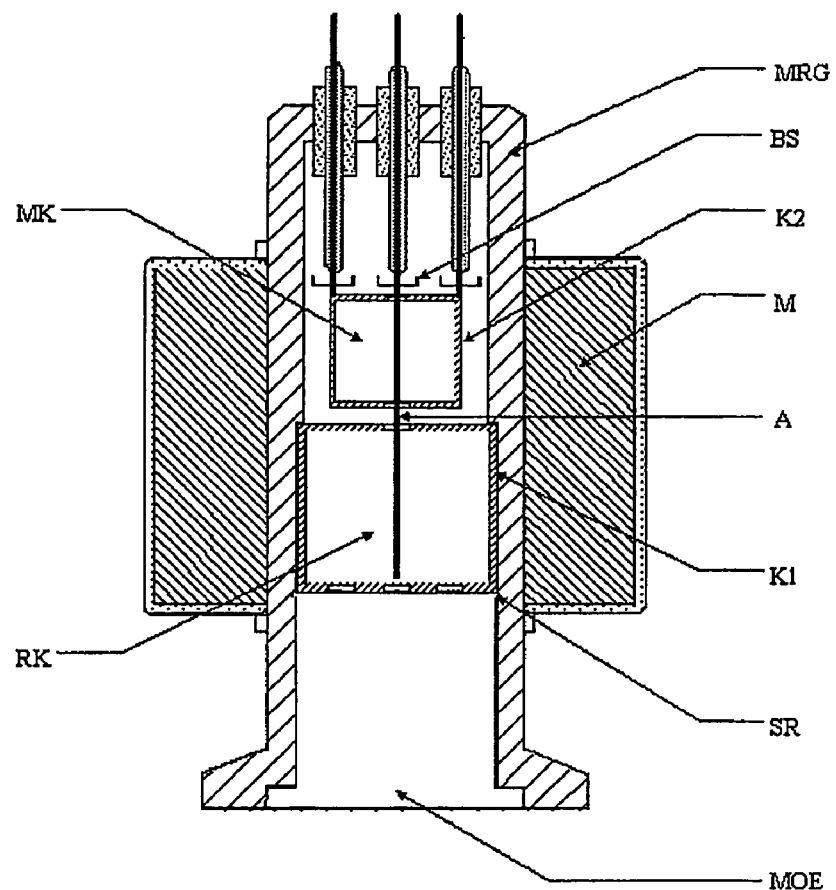

COLD-CATHODE IONIZATION MANOMETER HAVING A LONGER SERVICE LIFE DUE TO TWO SEPARATE CATHODES

BACKGROUND OF THE INVENTION

1. Field of the Invention

The invention relates to a cold cathode ionization manometer for measuring pressure in a vacuum, operating in accordance with the inverse magnetron principle and used for detecting pressures in the fine, high and ultra-high vacuum range (preferably between $10^7$ Pa and 1 Pa).

2. The Prior Art.

In ionization manometers of this type a spontaneous cold gas discharge is ignited by a high voltage between two unheated electrodes—the anode and the cathode—suitably arranged in the housing of a measuring tube. The ignition is maintained up to the smallest pressures by an additional magnetic field of sufficient field strength. The discharge current which flows during this time is dependent on the pressure over a very broad vacuum range and (usually) serves as a measure of the pressure. Known structures of cold cathode ionization manometers currently used commercially are the electrode configurations proposed by Penning and the magnetron and inverse magnetron tube structure developed by Redhead. A detailed description of such manometers can be found in Chr. Edelmann's book "Vakuumphysik", Spektrum Akad. Verl. Berlin, (1998).

Aside from their wide measuring range, cold cathode ionization manometers are characterized not only by a simple structure, they are also sturdy and immune to air irruptions and vibrations and they are relatively inexpensive. In addition to the numerous advantages to be derived from the use of these manometers, these measuring instruments nevertheless suffer from the decisive disadvantage which at least in time significantly limits their usefulness. With increasing service life, their measuring accuracy diminishes in consequence of contaminations of their measuring cells. These contaminations stem from the gas discharges taking place in the cold cathode ionization manometers. Since the charge carrier concentration in the measuring cells increases with increasing pressure thus leading to the generation of ever-increasing discharge currents, in the high and particularly in the fine vacuum range the high electric fields cause more and more ions to be accelerated strongly in the direction of the cathode and, upon impact, pulverize the cathode material. This sputtered cathode material is deposited on the walls and on electric insulating paths within the measuring tube and may there form conductive layers. An applied operating voltage may lead to leakage currents which are superimposed upon the discharge current and thus significantly limit the lower measuring range of the manometer. As a result of the described cathode pulverization, the useful life of the cathode is of limited duration. Since as a rule the cathode material is stainless steel, released particles of the formed contamination layers may be aligned in the magnetic field and lead to short circuits. Moreover, in the pressure range above $10^{-2}$ Pa, hydrocarbon containing vapors (oil vapors, etc.) may be cracked or polymerized in the plasma by interaction with high-energy charge carriers. The cracking products (usually layers of carbon) formed by these plasma-chemical reactions may also be deposited on electrode surfaces and there form surface layers which adversely affect the yield of their secondary electrons and which may shift characteristic curves and render an unstable indication of pressure. In the least favorable condition it is even possible that the discharge is extinguished with an accompanying failure of the measuring tube.

Since as a result of the interference effects described supra the useful life of the measuring instruments is limited, all conventional commercial cold cathode ionization manometers are structured such that they may be disassembled easily for cleaning contaminated electrodes or for replacing them by new ones. In this fashion it is possible completely to restore the original operating condition and, hence, efficiency of the measuring tube even after extended use, by removal of the contaminating layers from the measuring tube. However, in order lastingly to ensure full efficiency of these vacuum gages, it is necessary to calibrate or clean the measuring tubes at regular intervals which always entails increased maintenance and costs.

Although the effect of the contamination of these measuring tubes and their consequences has been known from the time of their application in vacuum measuring technology there are, or have been, few, if any, promising approaches to its reduction. Thus, a Penning gage is known from German patent specification 197 17 263 the cathode of which consists at least primarily of titanium. In view of the low yield of sputtered titanium, the pulverizing of the cathode material should proceed slowly which should result in an extended useful life of the cathode. It should, however, be taken into consideration that of all materials, titanium, because of its property of chemically absorbing active gases, is used, for instance, as cathode material in (Ti-) atomizing pumps, so that it is to be expected that Penning tubes equipped with Ti cathodes are subject to substantially higher pumping action than are cold cathode measuring tubes provided with conventional cathode material. Hence, the pressure indicated by them are likely to suffer from greater errors.

An earlier patent specification, GB 555,134, is based upon the concept of automatically reducing the operating voltage of the measuring tube by an electronic control circuit when, at a defined pressure in the upper vacuum range, the discharge current has attained a predetermined threshold value. If the pressure is increased further, the anode voltage is electronically reduced such that the discharge current remains constant, and the controlled anode voltage now serves as a measure of the pressure. Initially, this method was proposed as a method of broadening the measuring range of cold cathode ionizing manometers towards higher pressures. However, it may be assumed that it would also contribute to reducing the effect of contamination in the upper pressure range since owing to the lowering of the operating voltage the electrical field strengths are lowered as well, so that ions impinge upon the surface of the cathode at reduced energy. Moreover, by lowering the operating voltage, the discharge currents become smaller. The two actions, i.e. lowering the operating voltage and reducing the discharge current, result in a diminished rate of contamination. A similar but substantially simpler method is based upon examinations by Conn and Daglish ("The Influence of the Ballast Resistance on the Performance of Penning Vacuum Gages"; J. Sci. Instr. 31 (1954); pp. 403–434) which for limiting the discharge current at high pressures inserted a high-ohmic resistance between the anode of the measuring tube and the high voltage apparatus. As a result of this so-called ballast resistance the operating voltage at the anode is reduced as the pressure increases (and, hence, at increasing discharge current) so that the discharge current is limited at sufficiently high pressures.

In accordance with another patent specification, U.S. Pat. No. 4,000,457, the contamination of a tube may be avoided by applying to the measuring tube, at the upper vacuum range, a direct voltage pulsed as a function of pressure. While in the ultra-high and high vacuum ranges the cathode measuring tube is operated by a direct voltage in the conventional manner, a sinusoidal alternating voltage is superposed on the operating voltage as a function of the discharge current increasing with increasing pressure. In the upper pressure range the direct voltage component is lowered sufficiently that the discharge at high pressures is now pulsed sinusoidally only. As a result of this pulse measuring tube energization, the susceptibility to contamination of cold cathode measuring tubes is retarded, so that a substantially longer service life may be expected.

OBJECTS OF THE INVENTION

It is an object of the present invention from the very beginning to keep the rate of contamination of cold cathode ionization manometers low by an improved cold cathode measuring tube configuration and by a suitable measuring operation in order thereby to ensure a substantially longer service life of these measuring tubes.

BRIEF SUMMARY OF THE INVENTION

In accordance with the invention the object is accomplished by a cold cathode ionization manometer which resembles a classic inverse magnetron, except that, in contrast to hitherto conventional ones, it is provided with two sequentially arranged and electrically separated cathodes of drum or can-like configuration. The rod-shaped anode is arranged in the axis of symmetry of the two cathodes and extends through openings in front surfaces of the cathodes. By separately feeding voltage to the two cathodes, two gas discharges independent of one another are ignited between the cathodes and their common anode: One fulgurating at the input of the measuring tube and a second "internal" discharge shielded by the former. At least one opening in at least one of the front surfaces of the two cathodes facing each other is dimensioned to form a flow resistance to contaminating gases.

While such double plasma arrangements in cold cathode ionization manometers have been known from former patent specifications (e.g. DE 1,648,689 or U.S. Pat. No. 5,568, 053) the double discharge paths therein have always been used in a common measuring chamber (by separate magnetic field configurations) for the purpose of avoiding deviations in the pressure indications or for increasing the discharge current.

In the cold cathode ionization manometer in accordance with the invention, the functions of the two separately energized discharge chambers differ: The discharge fulgurating in the area of the first cathode near the measuring opening functions as a gas purifying device in which hydrocarbon or other contaminating vapors occurring as a result of plasma-chemical dissociation reactions are cracked or polymerized (this discharge area acts as a so-called ion baffle).

The discharge chamber in the area of the second cathode, which is arranged behind the measuring opening of the neighboring first cathode, functions as the measuring chamber proper. Only the discharge current flowing from this second discharge chamber is evaluated and made use of for pressure measurements. This particular double-plasma configuration offers the following advantage essential to the invention: The plasma fulgurating in the area of the first cathode and, hence, nearer to the vacuum chamber connecting to the measuring opening, is protecting the internal plasma fulgurating in the area of the second cathode and constituting the actual measuring position from interfering contaminations by condensing vapors. This prevents deposits in particular of undesirable carbon layers in the discharge chamber which is used for the actual measurements, which not only prevents shifting of any characteristic curve but also results in a noticeably reduced rate of contamination and, therefore, in a significantly longer service life of the measuring tube. This advantageous effect is augmented by the at least one opening in one of the facing front surfaces being dimensioned to form a predetermined flow resistance for contaminating gases.

For reducing the efficiency of the cathode atomization as a further main source of the contamination, the anode voltage, in a particularly advantageous embodiment of the invention, at pressures in excess of about $10^{-2}$ Pa is an alternating voltage the frequency of which is optimized in accordance with the geometric parameters of the measuring tube and the operating parameters. While the measuring tube in the entire lower vacuum range ($<10^{-2}$ Pa) is driven by a constant positive anode voltage $U_A$, at pressures above about $10^{-2}$ Pa it is advantageously operated by a sinusoidal or rectangular alternating voltage $U_A$ of constant frequency and constant amplitude. In this manner, the ions impinge on the cathodes only during the first half period, i.e. while the anode is positive relative to the cathodes, whereas during the second half period, when the anode is negative relative to the cathode, the ions are accelerated towards the anode and thereby can effectively clean themselves. In addition to the "self cleaning effect" thus achieved, the efficiency of the cathode atomization which contributes significantly to the process of contamination, particularly at higher vacuum pressures, is drastically reduced.

DESCRIPTION OF THE SEVERAL DRAWINGS

Figure 2:
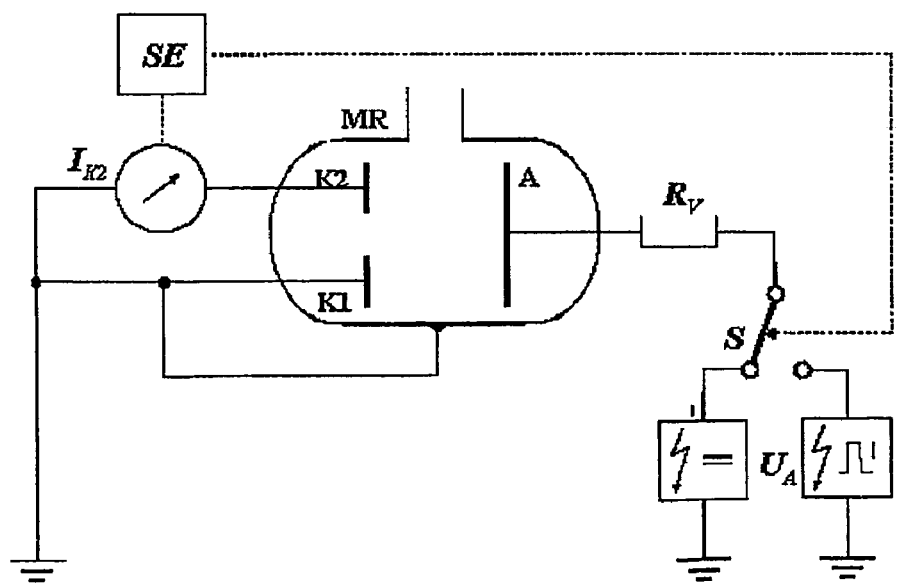

The novel features which are considered to be characteristic of the invention are set forth with particularity in the appended claims. The invention itself, however, in respect of its structure, construction and lay-out as well as manufacturing techniques, together with other objects and advantages thereof, will be best understood from the following description of preferred embodiments when read in connection with the appended drawings, in which:

FIG. 1 is a schematic representation in section of an embodiment of the invention; and FIG. 2 depicts the principle of the connection and energization of the measuring tube.

DESCRIPTION OF THE PREFERRED EMBODIMENT

The housing MRG of the measuring tube consists of a tubular flange which is closed at the opening positioned opposite the measuring opening MOE (and its connecting flange to the measuring position). The closed side of the tubular flange contains three vacuum tight electrically well insulated conduits which are provided with a vaporization protection BS, one concentric one for the rod-shaped anode A and two eccentric ones for the second cathode K2 the discharge current of which is used for measuring purposes. Instead of one of the two measuring conduits for the second cathode K2, a bracket well insulated from the housing may be provided as a rigid support for the cathode K2. The two cathodes K1 and K2 are of drum or can-shaped configuration with substantially closed cap-like end surfaces. The second cathode K2 is positioned in the closed section of the housing MRG of the measuring tube and is secured in its position by suitable clamping connections which in turn are held by the conduit electrodes. The front and rear surfaces of the second cathode K2 are each provided with an opening structured as a concentric bore with the rod-shaped anode A penetrating therethrough.

The first cathode K1 which is positioned nearer the measuring opening MOE is also closed by end caps provided with bores. By way of distinction from the second cathode K2, the first cathode K1 is provided with but one bore in one of its end surfaces so that the anode may extend therethrough, its other end surface being provided with several bores for an unimpeded passage of gas into the measuring tube. The first cathode K1 is rigidly mounted in the section of the measuring tube housing MRG facing the flange and is secured by a snap ring. One or more tubular high-performance permanent magnets are seated on the outer surface of the measuring tube housing with its or their field permeating the two discharge chambers RK and MK.

The principle of the electrical connection or energization of the measuring tube is made apparent by FIG. 2. By way of an electronically controlled change-over switch S and a series resistor $R_V$ for limiting the discharge current $I_{k2}$ and for stabilizing the characteristic curve in the upper vacuum range, the rod-shaped anode A of the measuring tube MR is fed with high voltage $U_A$ either from a direct voltage or from alternating voltage source.

Depending upon the conditions of pressure, the measuring tube is operated either with a direct voltage or a rectangular alternating voltage of suitable frequency. In the range of low pressures the operating voltage is a constant direct voltage; in the range of higher vacuum pressures the discharge is maintained by an alternating current. Switching from one operating mode to the other is carried out electronically, e.g. on the basis of an evaluation of the dissipating discharge currents by a control unit SE.

In order fully to avoid leakage currents between the two electrodes K1 and K2, the two cathodes are maintained at ground potential. While the first cathode K1 positioned near the measuring opening is grounded directly by way of the measuring tube housing MRG, the second cathode K2 which surrounds the actual measuring chamber is grounded by way of a sensitive current measuring apparatus which provides an indication of the pressure-dependent discharge current $I_{k2}$. The direct current measured in the lower vacuum range or the alternating current registered at higher pressures serves as a measure of the pressure and provides an indication thereof.

What is claimed is:

1. A cold cathode ionization manometer for measuring pressure in a vacuum and operating on the magnetron principle, comprising:

a vacuum-proof housing provided at one end thereof with a flanged opening for selectively admitting measuring gas;
a first cathode of substantially tubular configuration mounted in the housing adjacent the opening thereof;
a second cathode of substantially tubular configuration mounted in the chamber axially offset and electrically insulated from the first cathode; and
an elongated anode mounted in the housing substantially coaxially relative to and penetrating the first and second electrodes.

2. The manometer of claim 1, further comprising means for electrically energizing the anode.

3. The manometer of claim 2, wherein the means for electrically energizing the anode comprises a voltage source selectively switchable between alternating and constant voltage.

4. The manometer of claim 3, further comprising means for switching the voltage source in response to the level of pressure within the housing.

5. The manometer of claim 2, wherein in response to pressure in the housing in excess of $10^{-2}$ Pa the anode is energized by alternating voltage.

6. The manometer of claim 1, further comprising means for electrically energizing the first and second cathodes.

7. The manometer of claim 6, wherein the first cathode is electrically grounded by the housing.

8. The manometer of claim 6, further comprising means connected to the second cathode for measuring discharge current as a function of pressure in the housing.

9. The manometer of claim 8, wherein the second cathode is grounded by way of the current measuring means.

10. The manometer of claim 6, wherein the means for electrically energizing the second cathode comprises at least one vacuum-proof insulated conduit extending through the housing and provided with a vaporization protection.

11. The manometer of claim 1, wherein the first and second cathodes are provided with end surfaces forming apertures therein for receiving the anode.

12. The manometer of claim 11, wherein at least one of the apertures is dimensioned to form a predetermined flow resistance to contaminating gases.

13. The manometer of claim 1, further comprising means for replaceably mounting at least one of the first and second cathodes.

14. The manometer of claim 13, wherein the mounting means comprises a snap ring.

15. The manometer of claim 1, wherein the anode is mounted in the housing by a vacuum proof threaded connection.

* * * * *